April 7, 1925.
F. E. VOIGT
ELECTRIC SWITCH
Filed March 16, 1922
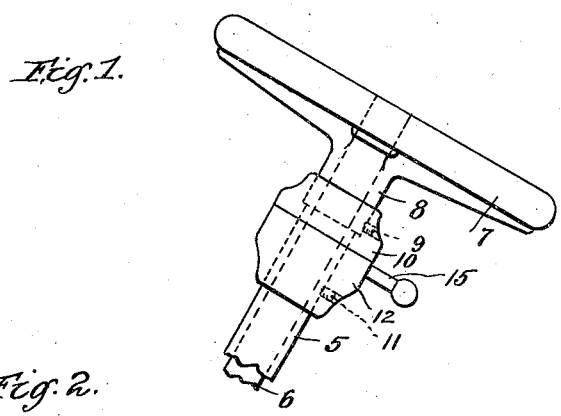
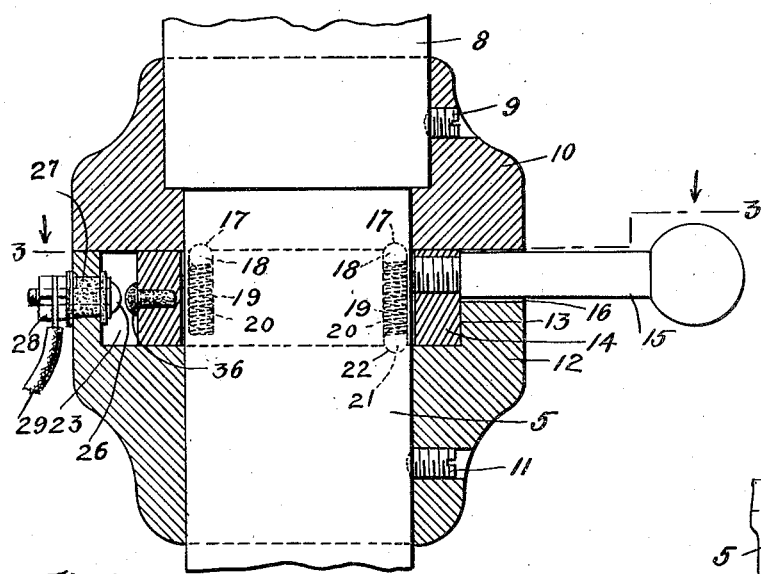
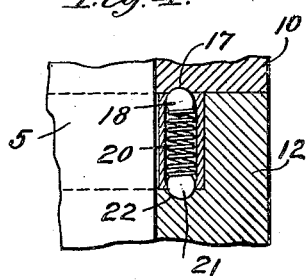
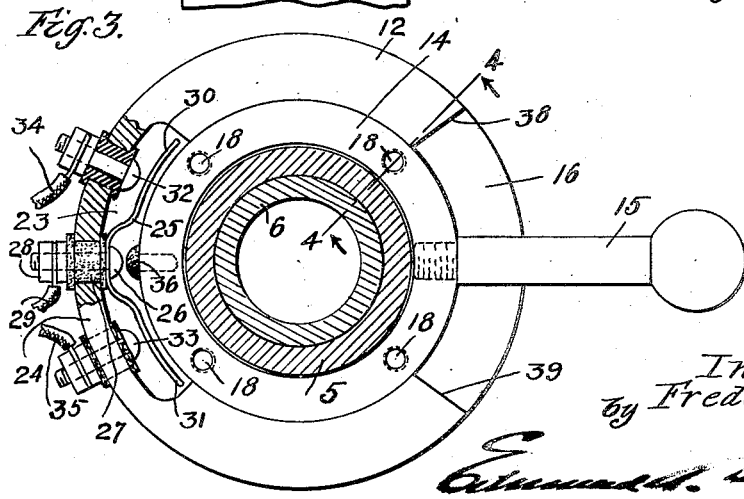
Inventor
by Frederick E. Voigt Patented Apr. 7, 1925.

1,532,563

UNITED STATES PATENT OFFICE.

FREDERICK E. VOIGT, OF LOS ANGELES, CALIFORNIA, ASSIGNOR TO VOIGT AUTOMATIC DIRECTION SIGNAL CO.

ELECTRIC SWITCH.

Application filed March 16, 1922. Serial No. 544,269.

*To all whom it may concern:*

Be it known that I, FREDERICK E. VOIGT, a citizen of the United States, residing at Los Angeles, in the county of Los Angeles and State of California, have invented new and useful Improvements in Electric Switches, of which the following is a specification.

My invention relates to electric switches particularly adapted to be used in connection with the steering apparatus of an automotive vehicle to control the lights of a display signal designed to indicate the direction the operator intends to turn the vehicle.

An object of my invention is to provide a simple and efficient switch for the purpose above mentioned, which may be conveniently secured to the steering apparatus of the vehicle, and which may be either independently operated by the vehicle driver, or automatically operated upon a movement of the steering wheel to display the proper signal.

Other objects of my invention will be more fully disclosed in the following description, and are illustrated in the accompanying drawings, in which:

Fig. 1 is a side view of the steering wheel and post of an automobile showing my invention applied thereto.

Fig. 2 is an enlarged fragmental vertical section through the same.

Fig. 3 is a transverse section through the same taken on the line 3—3 of Fig. 2, looking in the direction indicated by the arrows.

Fig. 4 is a fragmental section taken on the line 4—4 of Fig. 3, viewed in the direction indicated by the arrows.

In carrying out my invention 5 represents the steering column of an automobile, 6 the steering shaft journaled therein, and 7 the steering wheel thereof which is provided with the hub 8 secured to the shaft 6.

Secured to the rotatable hub 8 by means of the set screw 9 is a collar 10, and secured to the stationary column 5 by means of the set screw 11, and arranged directly under and in close proximity with collar 10, is a second collar 12. By this construction it will be seen that the collar 10 will be caused to rotate with the steering wheel 7 during a steering operation, and the collar 12 will be held stationary.

The collar 12 is provided in its upper surface with an enlarged bore 13, in which is journaled a ring member 14 surrounding the column 5, which is rotated independently of the steering wheel 7 by means of a radially disposed hand lever 15, secured thereto which passes through a slot 16 formed in the upper edge of collar 12.

The lower surface of the movable collar 10 is provided with a plurality of latch sockets 17 for the reception of the spring pressed latch balls 18 mounted in vertically disposed bores 19 formed in the ring member 14, the balls being yieldingly held in engagement with the sockets 17 by coiled springs 20. One of the bores 19 extends entirely through the ring 14, and has mounted in its lower end a latch ball 21 yieldingly held in engagement with socket 22 formed in the stationary collar 12 by one of the coiled springs 20.

The collar 12 is provided with a segmental groove 23 disposed opposite the slot 16, and mounted in the groove 23 is a spring contact member 25 secured at its central portion to the wall 24 by means of the binding screw 26 which passes through an insulating sleeve 27. The outwardly projecting end of screw 26 is provided with the usual binding nuts 28 by means of which a lead wire 29 from the positive pole of a source of electrical energy (not shown) is attached to the contact member 25.

The contact member 25 is provided with the spring arms 30 and 31 which are designed to contact respectively with the contact buttons 32 and 33 secured in the wall 24, and of similar construction to the binding screw 26, to which are secured the lead wires 34 and 35.

The switch is designed to open and close circuits through a signaling device mounted on the vehicle, and as the signaling device forms no specific part of my invention and may be of various types it has not been illustrated, it being sufficient to state that the wire 34 may lead to a lamp bulb adapted to indicate that the vehicle is about to be turned to the left and the wire 35 lead to another lamp bulb to indicate that the vehicle is about to be turned to the right.

Secured in the ring 14 and projecting beyond the peripheral surface thereof into the path of spring contact member 25 is a button 36 formed of insulating material which engages with the spring contact member 25 to close a circuit through either of the wires 34 or 35 upon a rotation of the ring 14.

In the operation of the switch it will be obvious that when the steering wheel 7 is turned in either direction to steer the vehicle, the ring 14 will be caused to turn therewith by reason of the engagement of the latch balls 17 with the collar 10, thereby making electrical contacts to operate the desired signal. It is, however, desirable that the signal should be displayed before the driver has started to turn the vehicle, and in this case it will be obvious that the driver may manipulate the lever 15 independently of the movement of the steering wheel to accomplish the same result, the lever 15 being yieldingly locked in a neutral position by means of the latch ball 21 which engages with the socket 22 in the collar 12. When the latch 15 is thus turned all of the latch balls ride out of their sockets to permit of this movement and the walls 38 and 39 of slot 16 acting as stops for the lever 15.

By this construction it will be seen that the steering wheel 7 may be then turned to perform a steering operation without disconnecting the signal contacts. When the steering wheel is righted to cause the vehicle to go straight ahead it will be obvious that the ball latches will again engage with their respective sockets to cause the circuit to be opened and the lever 15 to be brought back to the neutral position.

What I claim is:—

1. The combination with the steering mechanism of a vehicle, of a collar secured to the post thereof, a second collar secured to the steering wheel thereof, a ring member interposed between said collars adapted for rotary reciprocatory movement around the post of the steering mechanism, adapted to be yieldingly locked to said first and second mentioned collars, means for operating said ring member independently of said collars, and switch mechanism associated with said collars and ring member whereby upon a movement of either the first mentioned collar or said ring member electrical contacts will be made.

2. The combination with the steering mechanism of a vehicle, of a collar secured to the post thereof provided with an annular bore in its upper surface and a segmental groove and a slot communicating therewith, a ring member mounted in the annular bore of said collar provided with a radially disposed lever adapted to extend through the slot and a contact member operating button, a spring contact member secured to the wall of said collar and disposed in the segmental groove, a plurality of contact buttons mounted on said collar projecting into the segmental groove and adapted to be engaged by said spring contact member, a second collar secured to the steering wheel of the vehicle disposed above said first mentioned collar provided with latch engaging sockets, yielding latch members mounted in said ring member adapted to engage with the sockets in said second mentioned collar, and a yielding latch member mounted in said ring member adapted to engage with a socket formed in said first mentioned collar.

In witness that I claim the foregoing I have hereunto subscribed my name this 2nd day of March, 1922.

FREDERICK E. VOIGT.